United States Patent [19]
Jagadish et al.

[11] Patent Number: 5,551,029
[45] Date of Patent: Aug. 27, 1996

[54] METHOD FOR ASSOCIATING INTEGRITY MAINTENANCE CONSTRAINTS WITH DATA OBJECT CLASSES IN AN OBJECT-ORIENTED DATABASE

[75] Inventors: Hosagrahar V. Jagadish, Berkeley Heights, N.J.; Xiaolei Qian, Cupertino, Calif.

[73] Assignee: Lucent Technologies Inc., Murray Hill, N.J.

[21] Appl. No.: 108,406

[22] Filed: Aug. 18, 1993

[51] Int. Cl.$^6$ .............................. G06F 17/30; G06F 9/45
[52] U.S. Cl. .................. 395/600; 364/280.4; 364/280.5; 364/282.1; 364/DIG. 1; 395/700
[58] Field of Search ...................... 395/600, 500, 395/200, 650, 725, 800, 50, 51, 54, 700; 364/513, 280.4, 280.5, 282.1

[56] References Cited

U.S. PATENT DOCUMENTS

| | | | |
|---|---|---|---|
| 4,658,370 | 4/1987 | Erman et al. | 364/513 |
| 5,014,220 | 5/1991 | McMann et al. | 364/513 |
| 5,263,126 | 11/1993 | Chang | 395/51 |
| 5,265,206 | 11/1993 | Shackelford et al. | 395/200 |
| 5,295,256 | 3/1994 | Bapat | 395/500 |
| 5,367,675 | 11/1994 | Cheng et al. | 395/600 |

OTHER PUBLICATIONS

"A Generalized Constraint & Exception Handler for an Object–Oriented CAD–DBMS", Buchmann et al, IEEE 1986.

"Constraint Specification on Object–Oriented Databases", A. M. Alashgur, et al.; IEEE Publication, 1992.

R. Agrawal et al., "Ode (Object Database and Environment): The Language and the Data Model," Proc. ACM SIGMOD 1989 Int'l Conf. Management of Data, Portland, Oregon, May–Jun. 1989, pp. 36–45.

P. Bernstein et al., "Fast Maintenance of Semantic Integrity Assertions Using Redundant Aggregate Data," Proc. 6th Int'l conf. on Very Large Databases, 1980, pp. 126–136.

M. Casanova et al., "A Formal System for Reasoning About Progrms Accessing a Relational Database," ACM ACM Transactions on Programming Languages and Systems, 2(3), Jul. 1980, pp. 386–414.

M. Casanova et al., "Enforcing Inclusion Dependencies and Referential Integrity," Proc. 14th Int'l Conf. Very Large Data Bases, 1988, pp. 38–49.

(List continued on next page.)

Primary Examiner—Thomas G. Black
Assistant Examiner—Hosain T. Alam
Attorney, Agent, or Firm—Kenneth M. Brown

[57] ABSTRACT

A technique is provided for the association of constraints with data object classes in an object-oriented database. Given a constraint comprising zero or more quantifiers followed by a quantifier-free boolean expression, a non-primitive reference expression is identified in the boolean expression. The constraint is then modified as follows. First, the primitive reference expression at the head of the identified non-primitive reference expression is replaced with a variable. Then a universal quantifier which quantifies the added variable over all data objects in the class comprising that primitive reference expression is added to the constraint. Finally, a disjunctive condition specifying that the added variable is not equal to the primitive reference expression is added to the boolean expression. The modified constraint may then be associated with the class comprising the aforesaid primitive reference expression. This modification may be performed repeatedly, for each of a number of non-primitive reference expressions. The boolean expression may comprise one or more function calls with implicit non-primitive references which may be identified. The modified constraint may then also be associated with classes based on these references. The modified constraint may be evaluated whenever an object in an associated class is updated. A modified constraint which has been associated with a given class may be further modified to improve evaluation efficiency.

14 Claims, 6 Drawing Sheets

OTHER PUBLICATIONS

S. Ceri et al., "Deriving Production Rules for Constraint Maintenance," Proc. 16th Int'l Conf. Very Large Data Bases, 1990, pp. 566–577.

D. Cohen, "Compiling Complex Database Transition Triggers," Proc. ACM–SIGMOD 1989 Int'l Conf. on Management of Data, 1989, pp. 225–234.

G. Gardarin et al., "Proving Consistency of Database Transaction," Proc. 5th Int'l Conf. Very Large Data Bases, 1979, pp. 291–298.

N. H. Gehani et al., "Ode as an Active Database: Constraints and Triggers," Proc. 17th Int'l Conf. Very Large Data Bases, Barcelona, Spain, 1991, pp. 327–336.

L. Henschen, et al., "Compiling Constraint–Checking Programs from First–Order Formulas," in Advances in Database Theory, vol. 2, H. Gallaire, J. Minker, and J–M. Nicolas (ed.), Plenum Press, 1984, pp. 145–169.

A. Hsu et al., "Integrity Checking for Multiple Updates," Proc. ACM–SIGMOD 1985 Int'l Conf. on Management of Data, 1985, pp. 152–168.

S. N. Khoshafian et al., "Object Identify," Proc. 1st Int'l Conf. Object–Oriented Programming Systems, Languages, and Applications, Portland, Oregon, Sep. 1986, pp. 406–416.

W. Kim, "Object–Oriented Databases: Definition and Research Directions," IEEE Transactions on Knowledge and Data Engineering, Jun. 1990, pp. 327–341.

S. Koenig et al., "A Tranformaional Framework for the Automatic Control of Derived Data," Proc. 7th Int'l Conf. on Very Large Data Bases, 1981, pp. 306–318.

J–M. Nicolas, "Logic for Improving Integrity Checking in Relational Data Bases," Acta Informatica, 18, 1982, pp. 227–253.

R. Paige, "Applications of Finite Differencing to Database Integrity Control and Query/Transaction Optimization," in Advances in Database Theory, vol. 2, H. Gallaire, J. Minker, and J–M. Nicolas (ed.) Plenum Press, 1984, pp. 171–209.

X. Qian et al, "Integrity Constraint Reformulation for Efficient Validation," Proc. 13th Int'l Conf. Very Large Data Bases, 1987, pp. 417–425.

X. Qian, "An Effective Method for Integrity Constraint Simplification," Proc. IEEE 4th Int'l Conf. Data Engineering, 1988, pp. 338–345.

T. Sheard et al., "Automatic Verification of Database Transaction Safety," ACM ACM Transaction on Database Systems, 14(3), Sep., 1989, pp. 322–368.

D. Stemple et al., "On the Modes and Meaning of Feedback to Transaction Designers," Proc. ACM–SIGMOD 1987 Int'l Conf. on Management of Data, 1987, pp. 374–386.

M. R. Stonebraker, "Implementation of Integrity Constraints and Views by Query Modification," Proc. ACM–SIGMOD 1975 Int'l Conf. on Management Data, 1975, pp. 67–77.

G. Wiederhold, "Views, Objects, and Databases," IEEE Computer, 19(12), Dec. 1986, pp. 37–44.

METHOD FOR ASSOCIATING INTEGRITY MAINTENANCE CONSTRAINTS WITH DATA OBJECT CLASSES IN AN OBJECT-ORIENTED DATABASE

FIELD OF THE INVENTION

The present invention relates generally to object-oriented databases and more specifically to associating boolean constraints with the data contained in object-oriented databases.

BACKGROUND OF THE INVENTION

An object-oriented database is a database built on an object-oriented programming language. Object-oriented programming languages have become increasingly popular since the introduction of the programming language C++ in the mid 1980's. C++ has become a de facto standard programming language of choice in many scientific and engineering disciplines, thereby becoming widely known and used in the field of computer programming languages.

As a result of the inherent capabilities provided by object-oriented programming languages, it is natural and convenient to use them to build database systems. In particular, data "objects" of assorted types may be easily defined and accessed. Such objects provide flexible and efficient mechanisms with which a powerful database environment may be created. As used in the field of object-oriented programming, a data object is a particular item of data of a particular type. For example, a given program variable may contain an object which is data of type integer.

Most programming languages provide for a set of predefined data types, such as integers, reals, characters, arrays, pointers, etc. Object-oriented programming languages, however, enable the user (i.e., the programmer) to define new, additional data types. In C++, a user-defined data type is known as a "class." Specifically, a class is an aggregate of named data elements (known as data members), possibly of different types, and an optional set of operations (known as member functions) designed to manipulate that data. A "class object" is a particular item of data of a particular class.

Moreover, object-oriented programming extends such abstract data types to allow for relationships to be established between types and subtypes. This is achieved through a mechanism referred to as "inheritance," a primary characteristic of object-oriented programming. In particular, rather than re-implementing shared characteristics, a class can inherit selected data members of other classes. In C++, for example, inheritance is implemented through the mechanism of "class derivation." One class, known as the "derived class," may inherit selected data from another class, known as the "base class." In this manner, complex classes can be hierarchically derived from simpler classes.

The use of database systems (including object-oriented database systems) to maintain large and complex collections of information has become widespread. In many applications, it is important to be able to specify certain conditions which relate various items of data contained within the database. In some cases it may be important to know when one or more of these conditions becomes true or becomes false. In other cases it may be "demanded" that all of these conditions are always satisfied (i.e., true). An important example of this latter situation is in the maintenance of database integrity. Specifically, database integrity requires that all of the data contained in the database is logically consistent with itself, with other data in the database, and with any other semantic rules imposed by the database designer. In any case, these conditions are typically boolean (true/false) expressions, and are referred to generally as "constraints."

Databases must serve as an uncorrupted repository of data. Application programs that consult the database expect the database to supply correct data values. As such, the maintenance of integrity of the database is vital. Once a database loses integrity, correcting the problem can be difficult. This is because the location or source of the error is generally not obvious from the condition of the data. For example, a mismatch in data entries that are supposed to match could be due to an error in creating or updating either entry.

Not only is database integrity maintenance important, it can be a very time consuming task. This results from the fact that upon each update to the database (i.e., adding, deleting or modifying an entry), all of the constraints which might possibly be violated as a result of that update must be checked. For this reason it is advantageous to structure the database in such a manner as to ensure that a constraint is evaluated only when the update is made to a type of entry whose modification might have an effect on the evaluation of that constraint. In addition, an efficient representation of each constraint, allowing its evaluation to be performed quickly, is also of great importance.

By virtue of object orientation, some constraints in an object-oriented database are represented naturally and maintained "for free." Such constraints may be directly captured by the "type" system and the object class hierarchy. For example, in C++ a class person and another class child derived from the class person may be defined. In this manner, all of the characteristics (i.e., the information) associated with a person object (e.g., name, age, etc.) will automatically be associated with each child object as well. In other words, constraints are not needed to ensure that each child is, in fact, a person. Other forms of integrity constraints apply to a single object, and can therefore be directly associated with the object class specification used to define the class. For example, if one of the data items included in each person object is age and another is years-of-schooling, the database designer may reasonably wish to require that years-of-schooling be at least 5 less than age.

However, by taking the object-oriented approach, it also becomes unnatural to represent many inter-object constraints. For example, it may be desirable to have a constraint that the age of a person must be at least 12 greater than the age Of any child of that person. This constraint requires that the age attributes of two or more objects, a person and each child of the person, be compared. When an integrity constraint enforces some relationship across object boundaries in this fashion, it is unclear how or where to record such a constraint in an object-oriented database system. For instance, even though the constraint above was stated in terms of the age of a person with respect to that of the children, there is a complementary constraint on the age of a child with respect to that of the parents.

SUMMARY OF THE INVENTION

A technique is provided for the association of constraints with one or more categories of data entries in a database. The database may comprise an object-oriented database and the categories of data entries may comprise data object classes. Moreover, the constraint may comprise a database integrity maintenance constraint.

According to one illustrative embodiment of the present invention, a constraint comprises zero or more quantifiers followed by a quantifier-free boolean expression. A non-primitive reference expression is identified in the boolean expression, and the constraint is modified in accordance with the following steps. First, a primitive reference expression at the head of the identified non-primitive reference expression is replaced with a variable. Then a universal quantifier which quantifies the added variable over all data objects in the class comprising that primitive reference expression augments the constraint. Finally, a disjunctive condition specifying that the added variable is not equal to the primitive reference expression augments the boolean expression. Either the initial constraint or the modified constraint may then be associated with the class comprising the aforesaid primitive reference expression.

According to one illustrative embodiment of the present invention, the modification described above is performed repeatedly, for each of a number of identified non-primitive reference expressions. Each repetition is performed by starting with the modified constraint as produced by the previous iteration, and producing a further modified constraint therefrom. The constraint may then be associated with each of the resultant identified classes. Moreover, the constraint may be further associated with one or more of the classes over which the initial constraint was quantified.

According to another illustrative embodiment, the boolean expression may comprise one or more function calls with implicit non-primitive references. These references may be identified and the constraint may then be further associated with one or more classes based on these references. According to yet another embodiment, the constraint may be evaluated whenever an object in an associated class is added, deleted or modified.

According to other illustrative embodiments, a modified constraint which has been associated with a given class may be further modified to improve evaluation efficiency. According to one such embodiment, a universal quantifier over all objects in a class may be removed where there are no existential quantifiers outside the scope of the universal quantifier. The resultant further modified constraint may then be associated with the universally quantified class, and the further modified constraint may be evaluated whenever one of the objects in that class is added or modified.

According to another such embodiment, the modified constraint may be further modified according to the following method. First, the variable which previously replaced a primitive reference expression is replaced by that primitive reference expression. Then the universal quantifier which quantifies that replaced variable is removed. Finally, the disjunctive condition specifying that the replaced variable is not equal to that primitive reference expression is removed. This further modified constraint may then be associated with the class comprising the aforesaid primitive reference expression.

According to yet another of such embodiments, where the modified constraint comprises an existential quantifier of a class and no quantifiers outside the scope of the existential quantifier, the existential quantifier may be removed. Data representative of the set of objects in the class for which the further modified constraint evaluates to true may then be maintained, for example, by modifying the data whenever an object in the class is added, deleted or modified. In this manner, the modified constraint may be evaluated by determining whether the aforementioned set is non-empty.

According to still another of such embodiments, the modified constraint may be further modified based on a specified relationship between objects, such as, for example, a database relational integrity requirement. This further modified constraint may then be associated with one or more classes with which the modified constraint was associated.

In accordance with another embodiment of the present invention, a method is provided for evaluating a constraint associated with one or more categories of data entries in a database. The associated categories of data entries comprise less than all of the categories of data entries in the database. The constraint is evaluated when a data entry in an associated category is updated.

BRIEF DESCRIPTION OF THE DRAWINGS.

FIG. 4 is a flowchart of the technique of optimization by specialization. FIG. 5 is a flowchart of the technique of optimization via variable binding. FIG. 6 is a flowchart of the technique of optimization via redundant data. And FIG. 7 is a flowchart of the technique of optimization via inverse substitution.

DETAILED DESCRIPTION

Figure 1:
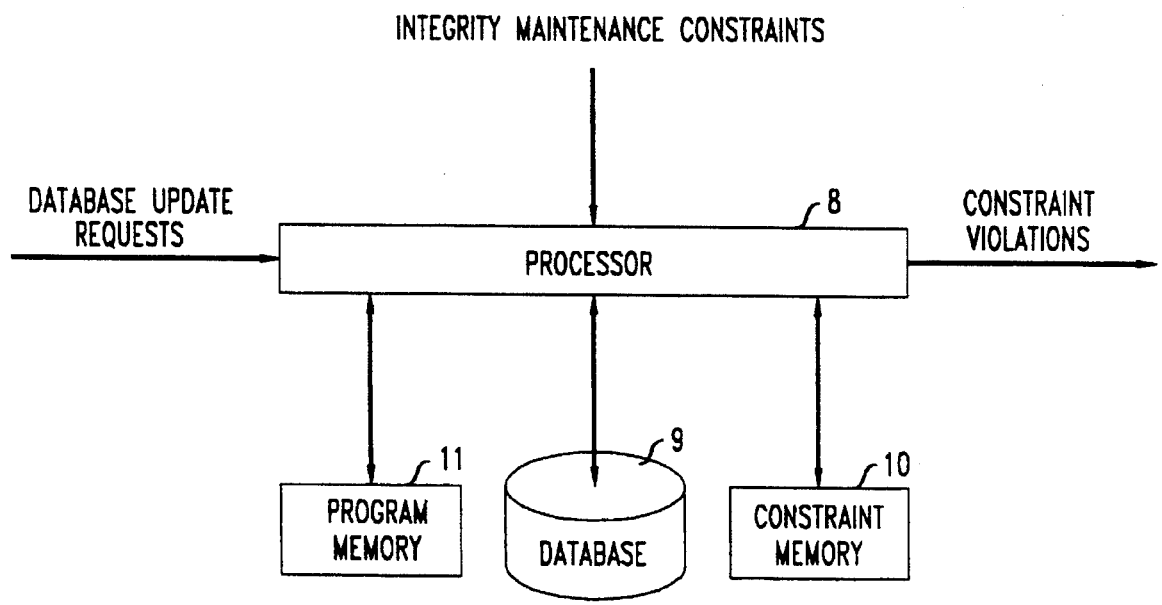
FIG. 1 is a block diagram of an illustrative database system comprising constraints which may be associated with data object classes in accordance with an illustrative embodiment of the method of the present invention.

FIG. 1 presents an illustrative database system comprising integrity maintenance constraints which may be associated with data object classes in accordance with an illustrative embodiment of the method of the present invention. The system comprises processor 8, database 9, constraint memory 10 and program memory 11. The system receives integrity maintenance constraints as input which may then be stored in constraint memory 10. These constraints may be modified in accordance with the method of the present invention, and the modified constraints thereby produced may also be stored in constraint memory 10. Moreover, constraints (either as input or as modified) may be associated with data object classes. These data object classes comprise data objects (as instances of the class) which may be included in database 9. This association may be determined in accordance with the method of the present invention.

Program memory 11 may be used to store software routines directing the operation of processor 8. These routines may include, for example, conventional database management software and conventional software providing for the specification of constraints and their evaluation. In addition, software routines for modifying constraints and for associating constraints with data object classes in accordance with the present invention (such as the routines illustratively shown in FIGS. 2–7 and described below) may also be stored in program memory 11 and executed on processor 8.

Once constraints (either as input or as modified) have been stored in constraint memory 10, they may be evaluated. If any of these constraints do not evaluate to true, the user may be informed that the constraint has been violated, enabling appropriate action to be taken. Moreover, constraints may be re-evaluated whenever a database "update" occurs in response to a database update request. (A database update, as used herein, includes a modification, deletion or addition of a data object in the database.) When such a re-evaluation results in the detection of a constraint violation, either the user may be informed or an appropriate automated action may be taken. For example, the database update may be prohibited (i.e., reversed, thereby restoring the database to its state before the update).

In a complex database application, constraint memory 10 may comprise many constraints and there may be a large number of occurrences of database update requests. For this reason, the method of the present invention, as illustratively embodied by the procedures of FIGS. 2–7, advantageously provides for the capability of evaluating each constraint only when the database update is made to a type of entry (a data object class) whose modification might have an effect on the evaluation of that constraint. Specifically, the procedure of FIG. 2 associates a constraint with one or more data object classes for which a database update which impacts a data object of that data object class may effect the evaluation result of the constraint. The procedure of FIG. 3 performs the association procedure of FIG. 2 and then, in response to a database update request, determines which constraints are to be re-evaluated. Each of the procedures of FIGS. 4–7 performs the association procedure of FIG. 2 followed by a modification of the associated constraint to improve the efficiency with which the constraint can be evaluated.

The detailed description of the following illustrative embodiments according to the method of the present invention will be described with reference to the illustrative computer system database of FIG. 1. Moreover, it will be assumed that database 9 comprises data relating to the personnel and departmental structure of an organization. This database will be illustratively implemented by an object-oriented database system based on the C++ programming language. The data objects contained in the database will be objects of specified classes, each of which is defined by C++ program code. Class declarations in C++ comprise two parts: a specification (type) and a body. The class specification can have a private part holding information that can only be used by its implementor, and a public part which is the class user interface. The body comprises the bodies of the member functions (also called methods) declared in the class specification but whose bodies were not given there. For example, the specification of the illustrative classes Dept (departments), Emp (employees) and Mgr (managers, a class derived from class Emp) may be written as follows.

```
class Dept {
    int budget;             //$ budget of the department
public:
    char dname[20];         //Name of the department
    mgr *head( );           //Identifies department head
    Emp *emps[[MAX_EMP_IN_DEPT]];
        //The double bracket denotes an unordered set,
        //  as opposed to a single bracket, which
        //  denotes an array.
        //  These are the employees of the department.
};
class Emp {
    int ssnum;              //Employee's social security
    int salary;             //Employee's salary
    Name name[20];          //Employee's name
    char sex;               //Employee's sex
    int sal( ) const {return salary; } //Returns salary
    Dept *dept;             //Employee's department
    Emp (Name n, char s, int snum, int salfig, Dept *d);
};
class Mgr: public Emp {
    Mgr (Name n, char s, int snum, int salfig, Dept *d);
}
```

The method according to an illustrative embodiment of the present invention operates on an initial constraint which has been specified as a condition to be evaluated and possibly maintained (e.g., as in the case of integrity maintenance). In particular, the constraint may be a boolean expression which, at any given time, will evaluate to true or false based on the then current values of the data in the database. In addition, the constraint may have an "action" associated with it, whereby the action is to be performed whenever the constraint evaluates to false (or, alternatively, to true).

The database system may provide facilities for associating a constraint with an object class. For reasons of efficiency, it may not be practical to check every constraint every time a modification is made with respect to any object in the database system. Only constraints which are logically associated with a given object class should be checked when an object of that class type is affected by a database transaction. In particular, the specified constraint condition may be checked every time an instance of each associated class is modified (e.g., through a public member function), or a new instance is created, or an old instance is deleted. (Constraints are advantageously checked after the specified transaction has been executed.) In the case of integrity maintenance, if the condition evaluates to false, an error is given or some other appropriate corrective action is taken. For example, the original transaction could be undone to prevent the violation of the constraint. In other cases, where an action is specified to be performed depending upon the evaluation of the condition, that action may be taken if the constraint evaluates to false (or, alternatively, to true).

By way of example, a simple intra-object integrity maintenance constraint which may be applicable to the class Emp might require that the sex field (which is declared to be of type char) should have a value exactly one of F and M. This requirement could be associated with the class stop and specified by a constraint of the form $$\text{sex}=\text{``F''}||\text{sex}=\text{``M''} \qquad (1)$$

This constraint could then be evaluated for a newly created or modified data object of class Emp, and need not be evaluated when an object of some other class is updated.

Constraints may include one or more universal or existential quantifiers, each specifying a variable name and a set over which the remaining portion of the constraint is to be quantified. For example, a variable may be specified as universally quantified over a data object class, thereby requiring that the remainder of the boolean expression evaluate to true for all existing objects in the database which are of that class type. Otherwise, the overall expression (i.e., the constraint) will not evaluate to true. In addition, a variable may be specified as existentially quantified over a data object class, thereby requiring that the remainder of the boolean expression evaluate to true for at least one existing object in the database which is of that class type. Otherwise, the constraint will not evaluate to true. In any event, the constraint may be logically partitioned into zero or more quantifications followed by a residual, where the residual comprises a quantifier-free (but not necessarily variable-free) boolean expression. Note that constraints with quantifiers may, in general, be inter-object constraints. Such constraints may require that a plurality of data objects (possibly of a plurality of class types) be examined to evaluate the constraint. For example, the following illustrative constraints may be provided for the organization database environment described above. The keywords forall and thereis have been illustratively used to represent universal and existential quantification, respectively.

forall d in Dept (thereis e in d–>emps[[]](e–>sal( )>d–>head–>sal( )/2)) (2)

thereis d in Dept (forall e in d–>emps[[]](e–>sal( )>d–>head–>sal( )/2)) (3)

Constraint (2) specifies in words that in each department there is at least one employee whose salary is more than half the department head's salary. Constraint (3) specifies that there is at least one department in which every employee's salary is more than half the department head's salary. These constraints may be requirements of the organization (as in an integrity maintenance context) or may merely be conditions which, if violated, require some particular, specified action to be taken. In any case, for efficient testing of these conditions, it is advantageous to associate the constraints (or a modified version thereof) with each object class for which an update to a data object of that class type might affect the evaluation of the constraint. In particular, an inter-object constraint is advantageously associated with all classes mentioned either explicitly through quantification, as well as with all classes mentioned either explicitly or implicitly through object reference. Moreover, inter-object constraints may be expressed as (possibly multiple) equivalent intra-object constraints, and then these equivalent constraints may be associated with corresponding object classes.

Figure 2:
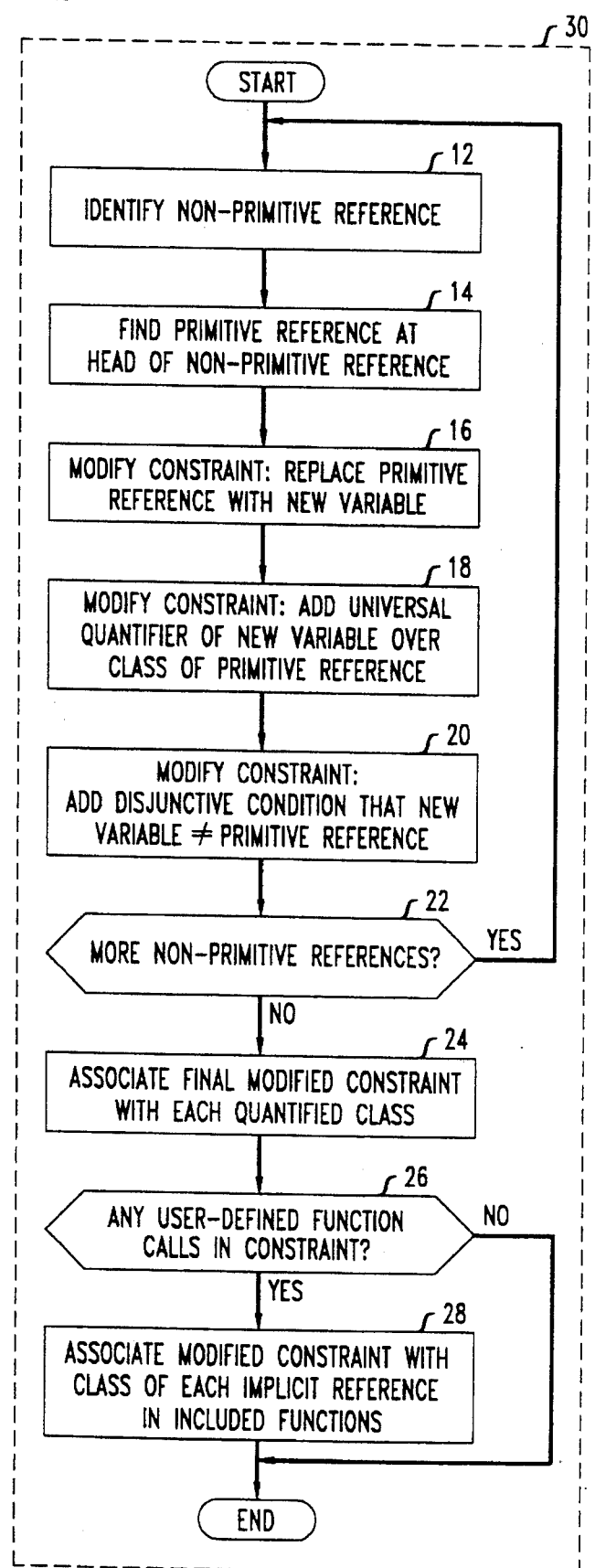
FIG. 2 is a flowchart of an illustrative embodiment of the method of the present invention whereby constraints may be modified and associated with one or more classes.

FIG. 2 is a flowchart of an illustrative embodiment of the method of the present invention whereby constraints may be modified and associated with one or more classes. The method as illustrated is implemented by procedure 30, which may be stored in program memory 11. This procedure transforms the initial constraint into a "modified" constraint which is then advantageously associated with the appropriate classes. The first step is to identify all the classes mentioned in explicit object references within the quantifier-free boolean expression. In particular, the constraint is transformed into a logically equivalent one such that all objects referenced explicitly in the constraint are "brought to attention" in the quantification.

Specifically, procedure 30 begins with step 12, which identifies a non-primitive reference expression in the quantifier-free boolean expression portion of an initial constraint which has been specified. A reference expression is an expression of the form e.a where e is an expression that evaluates to an object, and a is an attribute name (e.g., the name of a data member of the class of the object). A reference expression is primitive if e itself is not a reference expression. Thus, a non-primitive reference expression is an expression of the form ( ... (e.$a_1$).$a_2$) .... $a_n$, where n>1. Once step 12 has identified a non-primitive reference, step 14 is invoked to identify the primitive reference at the "head" of that non-primitive reference expression, namely e.$a_1$.

Next, steps 16, 18 and 20 each modify the initial constraint to produce a modified constraint. First, step 16 replaces the primitive reference e.$a_1$ identified in step 14 by a new (i.e., previously unused) variable name, say o. Next, step 18 augments the constraint by adding a universal quantifier of the new variable o over the object class of the primitive reference removed in step 16. Advantageously, this added quantifier is placed after all quantifiers of variables which occur in the object expression e at the head of the primitive reference e.$a_1$. Finally, the quantifier-free boolean expression is augmented at step 20 by adding a disjunctive condition (a logical "or"). This added condition specifies that the new variable o is not equal to the primitive reference e.$a_1$ removed in step 16.

Formally, steps 12–20 may be understood as follows. Let (Q ... )* denote a sequence of zero or more quantifications. Every inter-object constraint has the form $$(Qo_1 \in S_1) \ldots (Qo_n \in S_n) r(o_1, \ldots, o_n),$$ (4)

where Q is either ∀ (a universal quantifier) or ∃ (an existential quantifier), r is a quantifier-free boolean expression, and $S_1$ through $S_n$ are set-valued expressions (e.g., object classes). Now express the constraint in the form $$(Qo_1 \in S_1) \ldots (Qo_m \in S_m)(Q \ldots )^* R,$$ (5)

for some m≦n, and where R is the quantifier-free boolean expression r($o_1, \ldots, o_1$). Assume there is a non-primitive reference expression ( ... (e.$a_1$).$a_2$). ... $a_n$ (where n>1) in R such that e.$a_1$ is primitive and $o_1, \ldots, o_m$, are all the bound variables occurring in e. The transformation of steps 16, 18 and 20 with respect to primitive reference expression e.$a_1$ would then result in a modified constraint of the form $$(Qo_1 \in S_1) \ldots (Qo_m \in S_m)(\forall o \in S)(Q \ldots )^*[e.a_1/o](\neg(o=e.a_1) \vee R[e.a_1/o]),$$ (6)

where s is the class of e.$a_1$, o is a new variable not occurring anywhere in the constraint before the transformation step, and where (Q ... )*[e.$a_1$/o ] and R[e.$a_1$/o] denote the expressions obtained from (Q ... )* and R, respectively, by replacing all sub-expressions of the form e.$a_1$ with object reference variable o.

The next step in the procedure of FIG. 2 is decision 22 which determines if all non-primitive references in the constraint have been identified by step 12 and eliminated by the modification of step 16. If any remain, steps 12 through 20 are repeated, until all non-primitive references have been removed.

Once the modified constraint includes only primitive references, it may then be associated with each class which is explicitly quantified in the modified constraint. This association is performed by step 24. In alternative embodiments, the initial constraint, or some transformation of the initial constraint other than the above described modified constraint, may be associated with the classes identified in step 24. Therefore, references herein to the association of a modified constraint or a further modified constraint with a class or classes are to be construed as including as alternatives the association of the initial constraint or some other transformation of the initial constraint to such class or classes as well.

Note that given any set of data values, the modified constraint will evaluate to true if and only if the initial constraint does. This results from the fact that each step in the transformation (i.e., each iteration through steps 12 through 20) converts a constraint in one form to a logically equivalent constraint in another form. In particular, each transformation step results in a quantifier-free boolean expression in the modified constraint which states that either a new variable is not equal to an identified primitive reference, or the quantifier-free boolean expression of the initial constraint is true when that primitive reference is replaced by that variable. Obviously, such a transformation is tautological, thereby preserving the truth or falsity of the initial constraint.

Moreover, note that the modified constraint now has a quantification over the class of each explicit object reference present in the initial constraint. After the transformation, all explicit object references are identified by an additional universal quantifier, and there are no non-primitive reference expressions in the modified constraint expression. Since only non-primitive reference expressions could possibly denote object dereference, the transformation necessarily captures all the explicit object references in the initial constraint.

Thus, with the exception of implicit object references contained in user-defined functions which is discussed below, the association performed in step 24 is "complete." That is, the modified constraint is now associated with all classes for which the modification, deletion or addition of an object of that class type could possibly effect the result of the evaluation of the constraint, with one exception. It is possible that the result of an invocation of a user-defined function call contained in the constraint expression could depend upon the data values of an object in an unassociated class. If such function calls are not permitted in the specification of constraints, procedure 30 of FIG. 2 could, in an alternative embodiment, terminate after step 24.

If user-defined functioned calls are permitted in constraint expressions, however, procedure 30 advantageously continues with decision 26 to determine whether any such function calls are included in the constraint. If so, step 28 is performed to identify all implicit object references and to associate the modified constraint with the class of each of them. Assuming that no user-defined functions are compiled separately, this process may be applied recursively through all function definitions encountered in the constraint compilation process. In this manner, all implicit object references will be accounted for. Separately compiled user-defined or library functions must, on the other hand, explicitly "advertise" what classes they refer to. The same recursive procedure as described above, for example, may be used in the separate compilations to identify all implicit object references. In any case, this advertised list of classes can be incorporated at the time of constraint compilation, thereby associating the (modified) constraint with these classes as well as those determined recursively during constraint compilation.

By way of example, the result of the application of procedure 30 to constraints (2) and (3) described above gives modified constraints (7) and (8) as illustrated below.

forall $d$ in Dept (forall $m$ in Mgr  (7)
   (thereis $e$ in $d$->emps[[]]
   (!($m == d$->head) $|e$->sal() > $m$->sal()/2)))

thereis $d$ in Dept (forall $m$ in Mgr  (8)
   (forall $e$ in $d$->emps[[]]
   (!($m == d$->head) $|| e$->sal() > $m$->sal()/2)))

Thus, whereas constraint (2) stated that in each department there is at least one employee whose salary is more than half the department head's salary, modified constraint (7) states that for each department and for all possible managers, there is at least one employee for which it is true that either that manager is not the head of that department or the employee's salary is more than half of that manager's salary. Clearly constraint (2) and modified constraint (7) are logically equivalent. That is, one will evaluate to true if and only if the other does. Moreover, each object class for which the update (modification, deletion or addition) of a data object of that class type could effect the evaluation of the modified constraint is now explicitly quantified over in the modified constraint (7). Specifically, Dept, Emp and Mgr are quantified over in the modified constraint, whereas only Dept and Emp were in the initial constraint.

Similarly, whereas constraint (3) stated that there is at least one department in which every employee's salary is more than half the department head's salary, modified constraint (8) states that there is at least one department such that for all possible managers and for all employees in that department, either that manager is not the head of that department or the employee's salary is more than half of that manager's salary. Again, constraint (3) and modified constraint (8) are equivalent, and each object class for which the update of a data object of that class type could effect the evaluation of the modified constraint is explicitly quantified over in the modified constraint.

Figure 3:
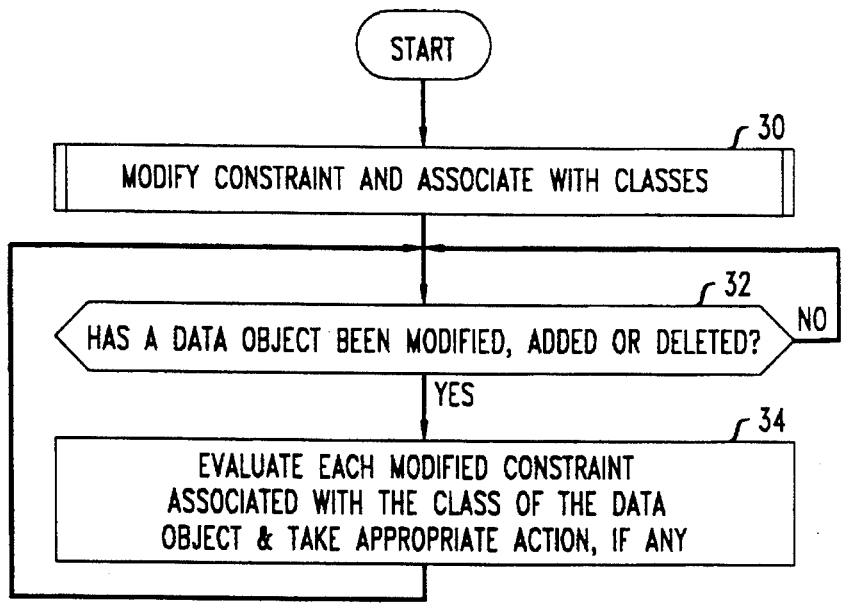
FIG. 3 is a flowchart of an illustrative embodiment of the method of the present invention in which constraints associated with a class may be evaluated whenever an object in that class is modified.

FIG. 3 is a flowchart of an illustrative embodiment of the method of the present invention in which constraints associated with a class may be evaluated whenever an object in that class is updated. The term update is used herein to include the modification (i.e., the alteration of one or more data values) of an object, the creation of a new object, and the deletion of an existing object.

Specifically, procedure 30 is performed as illustratively shown in FIG. 2 and described above to associate (modified) constraints with each explicitly or implicitly referenced class. Then decision 32 determines if a database transaction has occurred whereby some data object has been modified, created or deleted. If a data object has been updated, step 34 evaluates each constraint (if any) which has been associated with the class of the updated object. In addition, step 34 takes any appropriate action which may be necessary as a result of any of these constraint evaluations. Note that the method according to the embodiment illustrated in FIG. 3 ensures that each constraint is evaluated whenever an update of a data object occurs, but only for those updates which could conceivably cause the evaluation result (i.e., truth) of the constraint to change.

FIGS. 4–7 are flowcharts of further illustrative embodiments of the method of the present invention. In these embodiments, a modified constraint which has been associated with a given class is further modified so as to enhance efficiency of evaluation. Inter-object constraints are in general expensive to maintain. Moreover, the more quantifier nestings there are in a constraint, the more expensive it is to check its validity. The embodiments illustrated in FIGS. 4–7 may be used individually or in combination with each other to improve the evaluation efficiency of a modified constraint after it has been associated with one or more classes. Note that these optimizations may make use of the fact that the constraint is associated with a given class. Thus, when a modified constraint is associated with a plurality of classes, it may be further modified (i.e., optimized) into different further modified constraints for each of these different classes.

Figure 4:
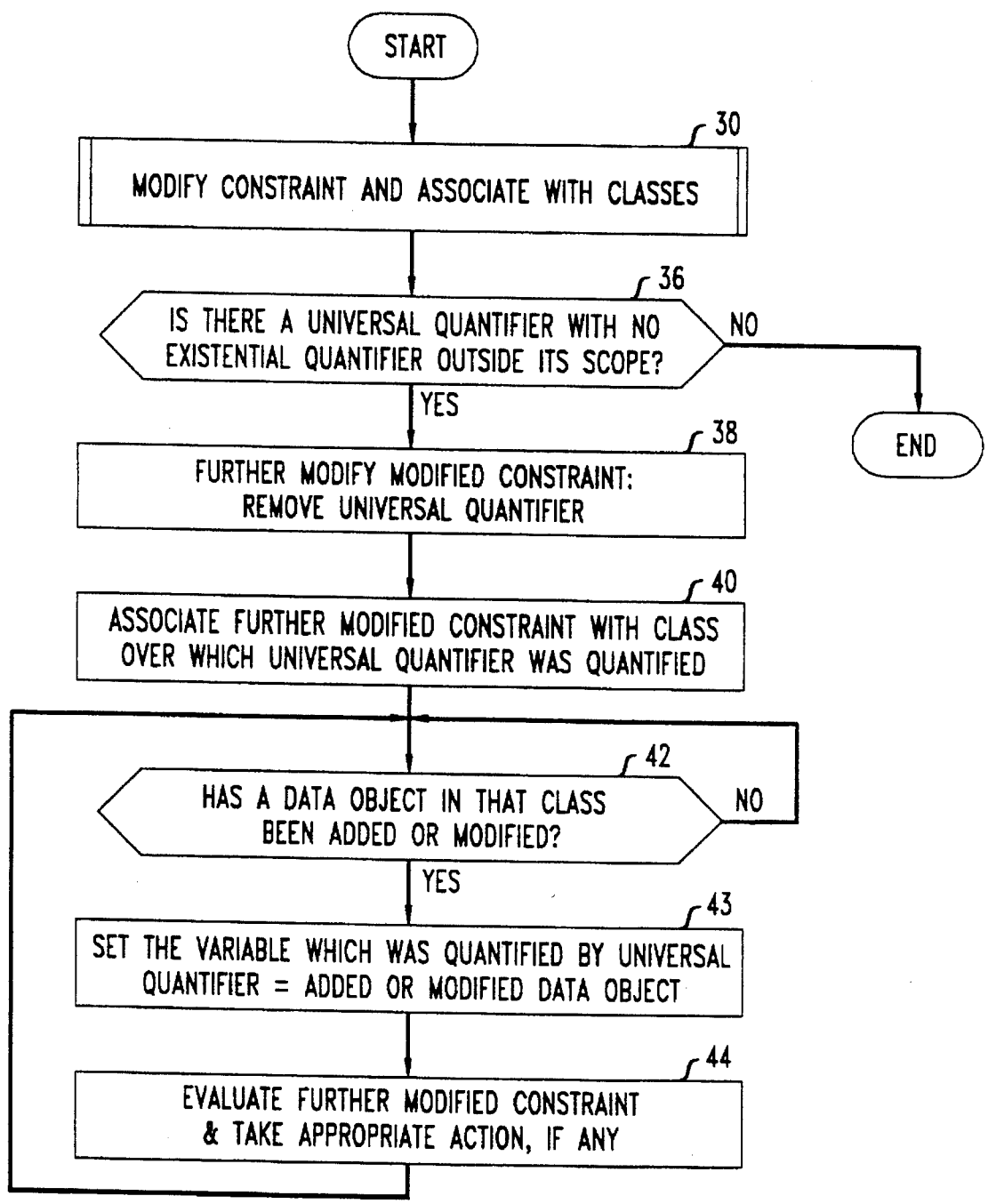
FIGS. 4–7 are flowcharts of illustrative embodiments of the method of the present invention whereby a modified constraint which has been associated with a given class may be further modified so as to enhance evaluation efficiency.

FIG. 4 is a flowchart illustrating the technique of optimization by specialization. This technique specializes a universally quantified constraint with respect to the specific object to which it is attached. In particular, an outermost universal quantifier may be removed, and this further modified constraint may then be evaluated for only those data objects in the quantified class which are actually created or modified. In other words, when a constraint is associated with a class S and is of the form $(\forall o \in S)e(o)$, the constraint merely states that $e(o)$ is true for all $o$ in S. Thus, the data values of those data objects in s which are not modified (or even those that are deleted) cannot cause the constraint to evaluate to false if it previously evaluated to true. If the constraint represents, for example, a database integrity condition, then if the database was valid before the change, other objects in S (which have remained the same) do not have to be checked against this change. It is sufficient, therefore, to evaluate the further modified constraint e[o/this], whenever an individual object in class S is created or modified. Note that the keyword "this" represents the specific data object being created or modified, and recall that the notation e [o/this] represents the expression e with all occurrences of o replaced by "this." The effect of this simplification technique is like associating a constraint with each individual data object in S instead of with the class S as a whole.

Specifically, the method of FIG. 4 begins with procedure 30, associating a modified constraint with appropriate classes. Then, decision 36 determines if the modified constraint has a universal quantifier with no existential quantifier outside its scope. Note that universal quantifiers are commutative. That is, the position of adjacent universal quantifiers may be switched with each other without affecting the evaluation result. Therefore, any universal quantifier which is outside the scope of all existential quantifiers may be advantageously relocated to be the outermost quantifier, thereby taking advantage of the technique of optimization by specialization. Step 38 removes the universal quantifier identified by decision 36. Note that all occurrences of the variable which had been quantified by the removed quantifier will henceforth represent "this," which is the identity of a specific data object. Step 40 associates this further modified constraint with the class over which the removed universal quantifier was quantified.

Now, when a database transaction occurs, decision 42 determines whether a data object in the class determined above was either added or modified. If so, the variable which had been quantified by the removed quantifier is set equal to the added or modified data object in step 43. Finally, step 44 evaluates the further modified constraint and takes appropriate action, if any, as a result of the evaluation.

By way of example, modified constraint (7) may be specialized with respect to the class Dept, resulting in the following further modified constraint which may be associated with class Dept.

forall m in Mgr (thereis e in emps[[]](!(m==head)|le->sal( )>m->sal( )/2))  (9)

Note that since we have specialized with respect to the class Dept (which was universally quantified by the variable d) the further modified constraint will be evaluated in the context of a specific data object of class type Dept. Therefore, the expressions d->emps[[]] and d->head become merely emps[[]] and head, respectively.

By way of further example, note that since universal quantifiers commute, we may also specialize modified constraint (7) with respect to the class Mgr. This results in the following further modified constraint which may be associated with class Mgr.

forall d in Dept (thereis e in d->emps[[]](!(this==d->head)|le->sal( )>sal( )/2))  (10)

Note that the expression m->sal( )/2 became merely sal( )/2 and that m became this, the latter representing the identity of the data object with respect to which the constraint is to be evaluated. Moreover, note that the constraints are no longer symmetric in that the further modified constraints as associated with different classes now differ, even though the original modified constraints were the same.

Figure 5:
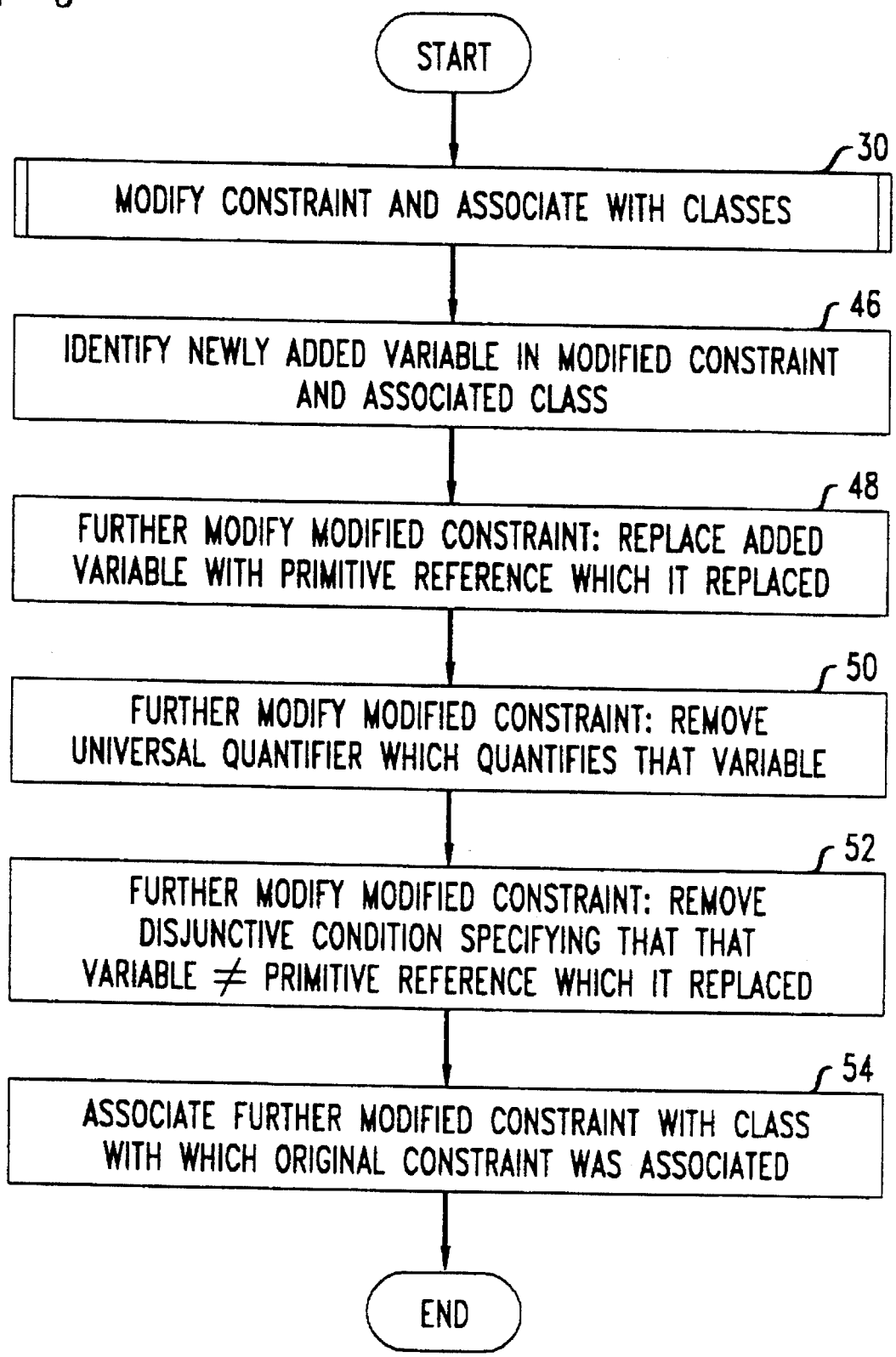

FIG. 5 is a flowchart illustrating the technique of optimization by variable binding. Procedure 30, which is applied as described above to capture all the classes with which a constraint is to be associated, introduces new universal quantifiers. Once the modified constraint has been produced and associated with the appropriate classes, however, it is often possible to "undo" some of the transformation individually for each replicated constraint in a class. That is, the extra universal quantification can be eliminated altogether by reversing the constraint modification process of procedure 30. Specifically, if a constraint associated with some particular class has the form $(Q_1 \ldots )*(\forall o \in S)(Q_2 \ldots )*(\neg(o=e) \vee R)$, and e does not contain any variables quantified in $(Q_2 \ldots )*$, then it can be transformed into the equivalent form $(Q_1 \ldots )*(Q_2 \ldots )*R[o/e]$.

Referring to FIG. 5, after procedure 30 has been performed, step 46 identifies a variable which has been added to the initial constraint, and a class with which the modified constraint is associated. Steps 48, 50 and 52 then perform the reverse of the modification process of procedure 30, by merely undoing the effects of steps 16, 18 and 20 of procedure 30. Thus, the previously added universal quantification is removed. Finally, step 54 associates this further modified constraint with the same class that was identified in step 46.

By way of example, further modified constraint (9) as associated with the class Dept, can be simplified even further after the optimization via specialization by employing the illustrative technique of optimization via variable binding. In particular, the quantification over the class Mgr may be removed, resulting in the following further modified constraint, which may then be associated with the class Dept.

thereis e in emps [[]](e->sal( )>head->sal( )/2)  (11)

Modified constraint (8), when associated with the class Dept, may also be simplified by removing the universal quantification over the class Mgr. This results in the following further modified constraint, which may be associated with the class Dept.

thereis d in Dept (forall e in d->emps[[]](e->sal( )>d->head->sal( )/2))  (12)

Note that in this case, the "simplified" form (i.e., the further modified constraint) is identical to the initial constraint (3). Thus, it may appear that all of this work has been superfluous. Note, however, that this simplification is not possible in all cases. For example, in the case of further modified constraint (10), when associated with the class Mgr, it is not possible to use this technique to "recreate" the initial constraint (2). Moreover, the overall transformation technique according to the illustrative embodiments described herein permit us to identify appropriate classes and to associate the correct constraints with all of them. Then, in certain cases, these constraints may be optimized by techniques such as variable binding for improved efficiency.

Figure 6:
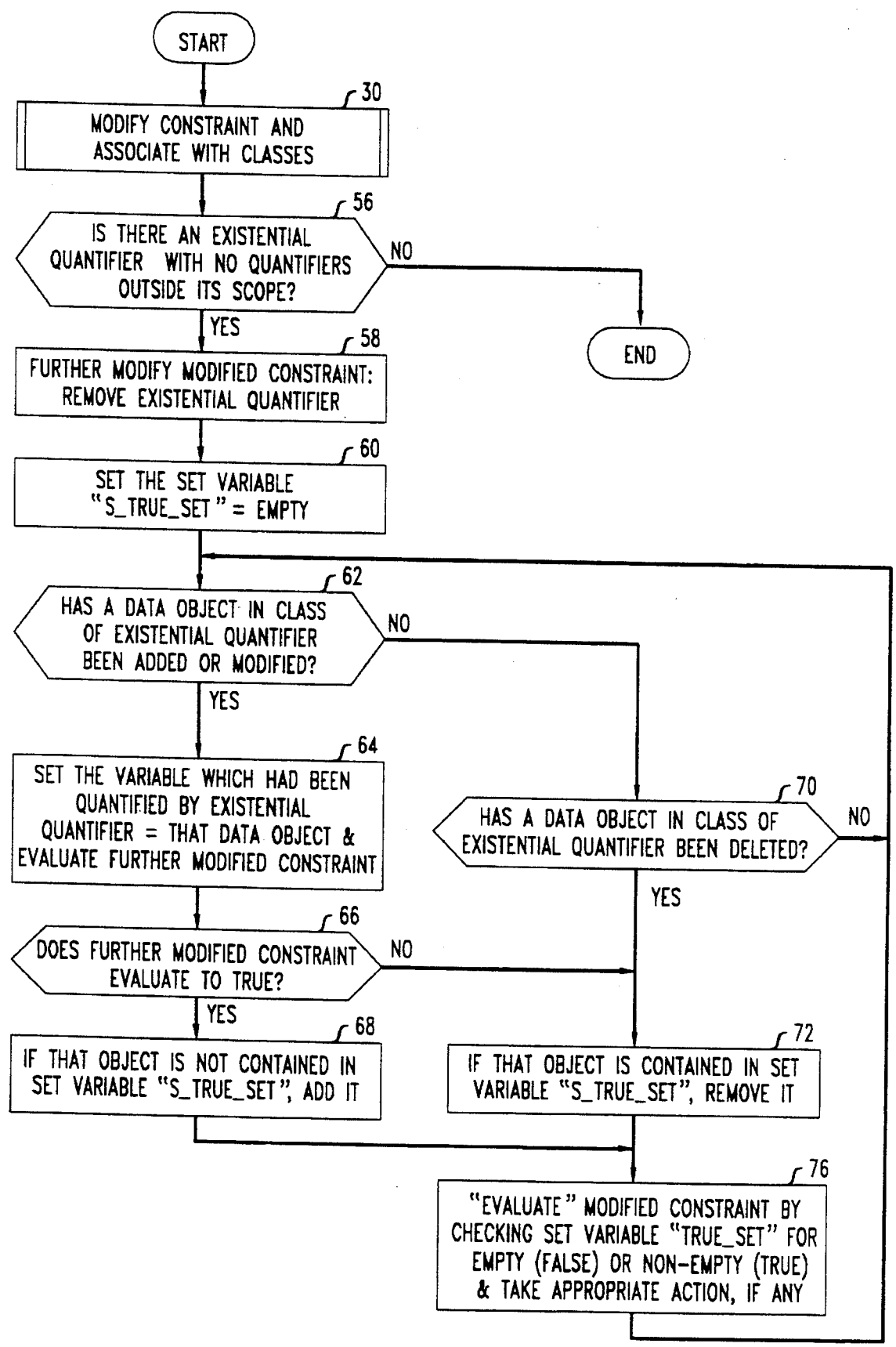

FIG. 6 is a flowchart illustrating the technique of optimization via redundant data. This technique may be used to evaluate any constraint which includes an existential quantifier as its outermost quantification. It can provide enhanced efficiency if object deletions in this existentially quantified class are frequent. Specifically, when the constraint is of the form $(\exists o \in S) e(o)$, it is possible to maintain (redundant) data to keep track of the subset of objects in S for which e(o) is true. In this manner, the constraint will become false if and only if this subset becomes empty. In an alternative embodiment, a count of the number of objects in S for which e(o)

is true may be maintained. In this case, the constraint will become false if and only if this number goes to zero.

The technique as illustrated in FIG. 6 begins with procedure 30 which associates a modified constraint with one or more classes. The modified constraint is tested by decision 56 for the applicability of the instant technique. If the outermost quantifier is an existential quantifier over a class S, step 58 produces a further modified constraint by removing the existential quantifier. In addition, step 60 initializes a set variable "S_true_set" to be empty. This variable will keep track of the set of data objects (in the class S) for which the further modified constraint is true. It is initially empty, since before any data objects have been inserted into the database, there obviously are none.

Whenever a data object in the class S is added to the database or modified (as determined by decision 62), the further modified constraint is evaluated with respect to that object by step 64. That is, the variable which had been quantified by the removed existential quantifier is set equal to the current object ("this") and the evaluation is performed. If the further modified constraint evaluates to true as determined by decision 66, step 68 adds the data object to the set "S_true_set" if it is not already there. If, on the other hand, the further modified constraint evaluates to false, step 72 removes the data object from the set "S_true_set" if it is there. In addition, whenever a data object in the class S is deleted (as determined by decision 70), step 72 removes the data object from the set "S_true_set" if it is there. Finally, when there has been any update (i.e., addition, modification or deletion) to a data object in the class S, step 76 evaluates the modified constraint merely by checking the value of the set variable "S_true_set." If the value of the set variable is empty, the modified constraint is false. If it is non-empty, the modified constraint is true. Step 76 may also take any appropriate action in response to the evaluation.

Figure 7:
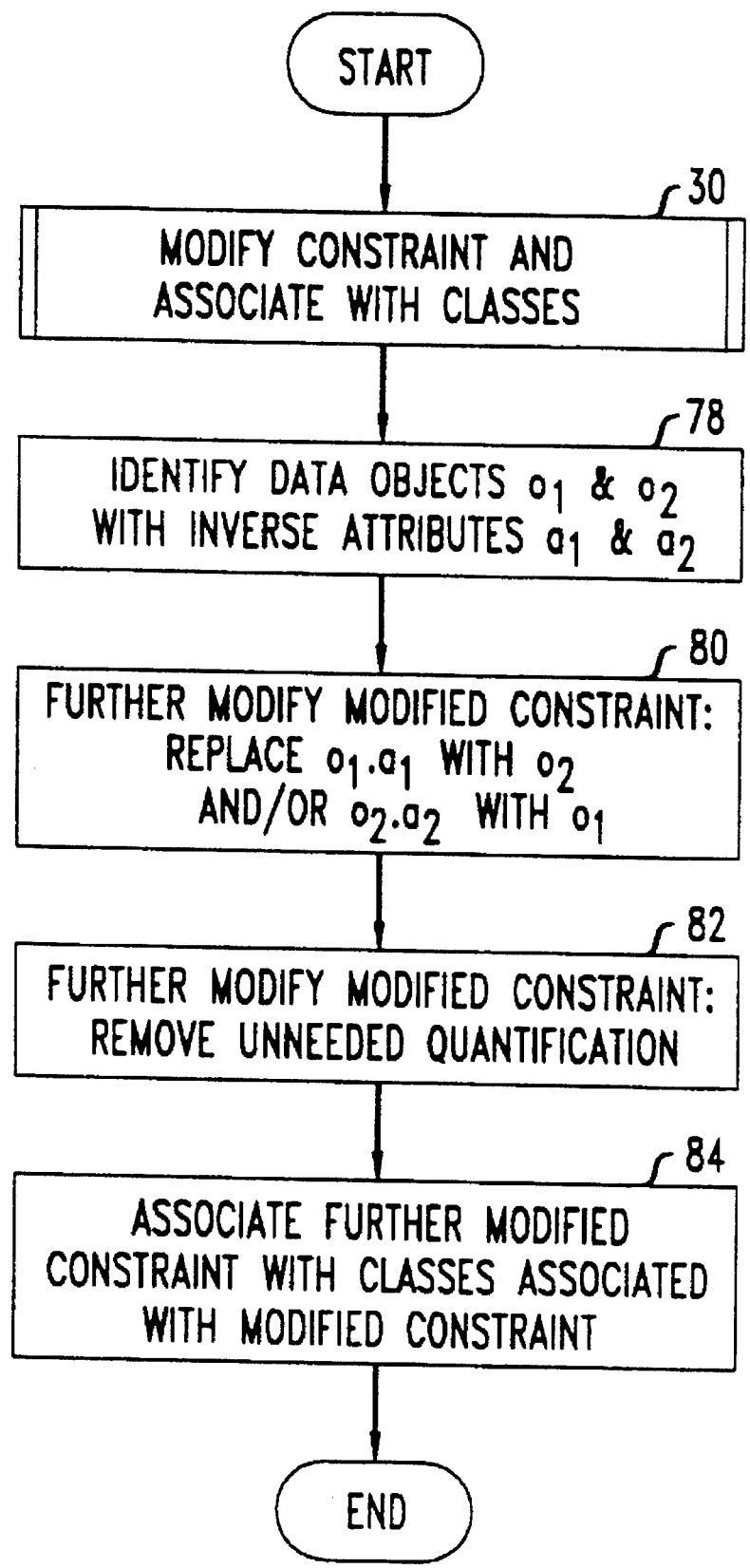

FIG. 7 is a flowchart illustrating the technique of optimization via inverse substitution. This technique makes use of the existence of known (and specified) relationships between objects in the database. For example, the property of relational integrity in an object oriented database is a special case of an inter-object integrity maintenance constraint in which a binary relationship between two objects is to be maintained. This maintenance typically occurs in the form of complementary, inverse pointers. An example of such a relationship can be found in the organization database illustrated above, in that the manager field (Mgr) of a department (class Dept) must point to a manager (class Mgr) whose department field (Dept) must point back to the original department. These requirements can, of course, be represented by appropriate constraints. However, given that it is known that this relationship is not violated, other constraints can be optimized by the substitution of one expression for another, equivalent expression.

Specifically, assume that objects $o_1$ and $o_2$ have attributes $a_1$ and $a_2$, respectively, which are inverse pointers, thereby reflecting referential integrity between the objects. In other words, $o_1=o_2.a_2$ and $o_2=o_1.a_1$. Then, various transformations, comprising one or more applications of the above equalities, may be used to simplify a constraint. For example, $o_1.a_1.a_2$ may be replaced by $o_1$, and $o_2.a_2.a_1$ may be replaced by $o_2$.

In addition to simplifications which may result merely from the simplification of the boolean expression, it is often possible with this technique to eliminate a quantification as well. In other words, by eliminating references to certain objects with inverse pointers in favor of references to a complementary object, the resultant constraint may eliminate all references to a quantified variable. Thus, the corresponding quantification may be removed altogether.

Referring to FIG. 7, procedure 30 is performed to associate a modified constraint with one or more appropriate classes. Then, step 78 identifies objects with known inverse attributes reflecting, for example, referential integrity. Step 80 produces a further modified constraint by modifying the modified constraint in accordance with the substitutions described above. Step 82 removes any quantifiers whose variable no longer appears in the boolean expression. Finally, step 84 associates the further modified constraint produced by steps 80 and 82 with the class or classes that had been associated with the modified constraint produced by procedure 30.

By way of example, consider further modified constraint (10) as associated with the class Mgr. Given the knowledge that the dept attribute of the Mgr class is the inverse of the head attribute of the Dept class, this constraint can be further simplified to the following further modified constraint.

$$\text{thereis } e \text{ in dept} \rightarrow \text{emps}[[]](e \rightarrow \text{sal}( ) > \text{sal}( )/2) \tag{13}$$

Note that similar optimizations may be performed based on known relationships other than inverse pointer references in alternative embodiments.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A computer-implemented method for associating a constraint stored in a memory with one or more data object classes in an object-oriented database, wherein the constraint reflects an initial constraint which comprises zero or more initial quantifiers and a quantifier-free boolean expression, the method comprising the steps of identifying one or more data object classes upon which an evaluation of the constraint depends; and associating the constraint with the one or more identified data object classes, wherein the identifying step comprises the steps of (a) choosing a non-primitive reference expression in the quantifier-free boolean expression and determining a primitive reference expression at the head of the non-primitive reference expression;

(b) modifying the initial constraint to produce a modified constraint by (i) replacing the primitive reference expression in the quantifier-free boolean expression with a first variable;

(ii) augmenting the zero or more initial quantifiers with a first universal quantifier of the first variable over all data objects in a data object class, which class comprises the data object referred to by the primitive reference expression; and (iii) augmenting the quantifier-free boolean expression with a disjunctive condition specifying that the first variable is not equal to the primitive reference expression; and (c) identifying the data object class comprising the data object referred to by the primitive reference expression.

2. The method according to claim 1 wherein steps (a) and (b) are each performed one or more times, wherein the initial constraint of each performance of steps (a) and (b) other than the first such performance comprises the modified constraint produced by a previous performance of step (b).

3. The method according to claim 2 further comprising the step of further associating the constraint associated with the one or more identified data object classes with one or more data object classes over which the initial constraint of the first performance of steps (a) and (b) is quantified by the zero or more initial quantifiers.

4. The method according to claim 3 wherein the constraint comprises the initial constraint of the first performance of steps (a) and (b).

5. The method according to claim 3 wherein the constraint comprises the modified constraint produced by one of the performances of step (b).

6. The method according to claim 5 wherein the constraint comprises the modified constraint produced by the last performance of step (b).

7. The method according to claim 3 wherein the quantifier-free boolean expression of the initial constraint of the first performance of steps (a) and (b) comprises one or more function calls, the method further comprising the steps of identifying one or more object references in one or more of the function calls; and further associating the constraint with one or more data object classes based on the identified object references.

8. The method according to claim 3 wherein the modified constraint produced by a given performance of step (b) comprises a second universal quantifier of a second variable over all data objects in a given data object class and no existential quantifiers outside the scope of the second universal quantifier, the method further comprising the steps of further modifying the modified constraint produced by said given performance of step (b) by removing the second universal quantifier;

associating the further modified constraint with said given data object class; and evaluating the further modified constraint when a data object in said given data object class is added or modified, the evaluation performed with the second variable set equal to the added or modified data object.

9. The method according to claim 3 further comprising the steps of further modifying the modified constraint produced by a given performance of step (b) by
(i) replacing the first variable inserted by one of the performances of step (b) in the quantifier-free boolean expression with the primitive reference expression which it replaced by said one of the performances of step (b),
(ii) removing the first universal quantifier of the first variable over all data objects in the data object class comprising the data object referred to by the primitive reference expression, which first universal quantifier augmented to the zero or more initial quantifiers by said one of the performances of step (b), and
(iii) removing the disjunctive condition which augmented the quantifier-free boolean expression by said one of the performances of step (b); and associating the further modified constraint with the data object class comprising the data object referred to by the primitive reference expression, which primitive reference expression was replaced by said one of the performances of step (b).

10. The method according to claim 3 further comprising the step of evaluating the constraint when one or more data objects in one or more of the data object classes associated with the constraint are updated.

11. The method according to claim 10 wherein the modified constraint produced by a given performance of step (b) comprises an existential quantifier of a second variable over all data objects in a given data object class and no quantifiers outside the scope of the existential quantifier, the method further comprising the steps of further modifying the modified constraint produced by the given performance of step (b) by removing the existential quantifier; and maintaining data representative of the set of all data objects in said given data object class for which the further modified constraint evaluates to true, the evaluation of the further modified constraint being performed for each one of the data objects with the second variable set equal to the corresponding one of the data objects; and wherein the evaluation step comprises determining whether said set is non-empty when one or more data objects in said given data object class is updated.

12. The method according to claim 11 wherein the step of maintaining the representative data is performed by modifying the representative data when one or more data objects in said given data object class are updated.

13. The method according to claim 3 further comprising the steps of further modifying the modified constraint produced by a given performance of step (b) based on a specified relationship between data object attributes by transforming the modified constraint produced by said given performance of step (b) into a further modified constraint with use of a substitution of a data object attribute for another, the substitution not effecting the result of constraint evaluation; and associating the further modified constraint with one or more of the data object classes associated with the constraint.

14. The method according to claim 13 wherein the specified relationship between data object attributes reflects a database relational integrity maintenance requirement.

* * * * *